No. 607,390. Patented July 12, 1898.
A. YATES.
EAR FOR VESSELS.
(Application filed June 21, 1895.)
(No Model.)
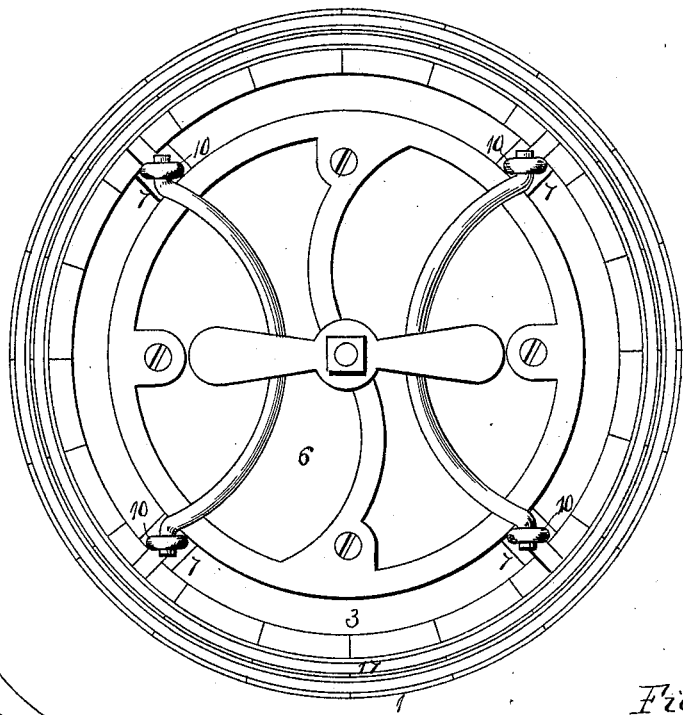
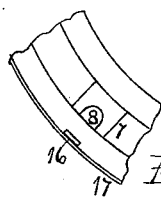
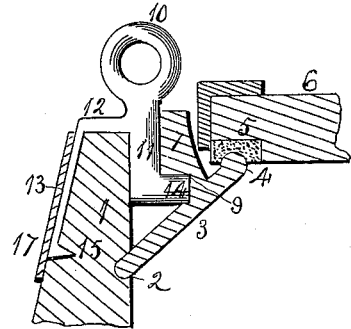
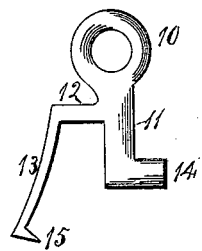
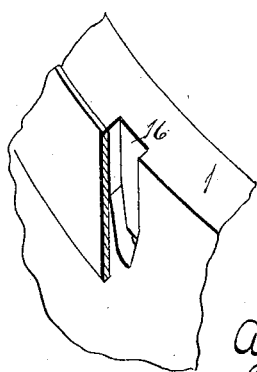
Witnesses:
E. Behel.
J. Sovereign
Inventor
Alexander Yates
By A. O. Behel
Atty.

UNITED STATES PATENT OFFICE.

ALEXANDER YATES, OF ROCKFORD, ILLINOIS, ASSIGNOR TO THE H. H. PALMER COMPANY, OF SAME PLACE.

EAR FOR VESSELS.

SPECIFICATION forming part of Letters Patent No. 607,390, dated July 12, 1898.

Application filed June 21, 1895. Serial No. 553,599. (No model.)

*To all whom it may concern:*

Be it known that I, ALEXANDER YATES, a citizen of the United States, residing at Rockford, in the county of Winnebago and State of Illinois, have invented certain new and useful Improvements in Ears for Vessels, of which the following is a specification.

The object of this invention is to construct an ear for vessels in which the ear is held in position without a fastening-bolt or other means passing through the vessel.

In the accompanying drawings, Figure 1 is a plan view of a vessel containing my improvements. Fig. 2 is a vertical section through one of the ears. Fig. 3 is a side elevation of one of the ears. Fig. 4 is an isometrical representation of a portion of the open end of the vessel. Fig. 5 is a plan view of a section of the open end of the vessel.

The churn-body 1 is of the usual construction, and its open end is provided with a croze 2. A ring-head 3 is seated within the croze, having an upturned edge 4 to receive a packing 5 of the removable head 6. The ring-head has four uprising projections 7, each being formed with a vertical recess 8 and a horizontal depression 9.

An ear to receive the fastening means is composed of an eye portion 10, from the lower end of which extends a portion 11, and a horizontal portion 12, from the end of which depends a portion 13. A stud 14 extends from the end of the portion 11, and from the end of the section 13 extends a prong 15. This section in its original condition is curved outward, as shown at Fig. 3.

Before the ring-head is placed in position the stud 14 of each of the ears is placed in the depression in the projections 7, and the portion 11 will lie within the recess 8. The head is then placed in position in the croze of the vessel, and the portions 11 will lie along the inner face of the vessel, while the portions 13 will stand free of the vessel until it is pressed within a recess 16 in the outer surface of the vessel and the prong driven into the vessel. A hoop 17 is then driven over the open end of the vessel and over that portion of the ears lying outside of the vessel, which, in connection with the projections 14 and 16, will hold the ear firmly in position. The eye portions of these ears are so arranged that a pair of bails are supported thereby, and a fastening device secured to the cover engages the bails, thereby forming a connection between the ring-head and cover.

I claim as my invention—

1. A vessel having a ring-head, an ear having an eye portion and provided with a portion engaging the ring-head, and a portion engaging the outer face of the vessel.

2. A vessel having a ring-head, an ear having an eye portion and provided with a prong engaging the inner face of the vessel and having an engagement with the ring-head, a portion engaging the outer face of the vessel having a prong or projection adapted to engage the vessel, and a hoop placed on the outside of the vessel overlying the outer portion of the ear.

ALEXANDER YATES.

Witnesses:
SAMUEL D. PALMER,
A. O. BEHEL.